United States Patent [19]
Larsen

[11] 3,888,700
[45] June 10, 1975

[54] ABSORBENT SEPARATOR FOR AN ELECTRIC BATTERY

[75] Inventor: Duane M. Larsen, Madison, Wis.

[73] Assignee: ESB Incorporated, Philadelphia, Pa.

[22] Filed: Nov. 1, 1968

[21] Appl. No.: 772,775

[52] U.S. Cl. ............... 136/146; 136/148; 136/131
[51] Int. Cl. ........................................... H01m 3/02
[58] Field of Search .......... 136/131, 137, 146, 158, 136/148

[56] References Cited
UNITED STATES PATENTS

| | | | |
|---|---|---|---|
| 2,307,627 | 1/1943 | Lawson | 136/131 X |
| 2,855,452 | 10/1958 | Morehouse et al. | 136/137 X |
| 2,923,757 | 2/1960 | Klopp | 136/146 X |
| 3,023,259 | 2/1962 | Coler et al. | 136/147 X |
| 3,048,647 | 8/1962 | Korver et al. | 136/146 |
| 3,328,208 | 6/1967 | Ryhiner et al. | 136/146 X |
| 3,337,482 | 8/1967 | Watanabe et al. | 260/17.4 |
| 3,357,865 | 12/1967 | Davis et al. | 136/137 |
| 3,513,033 | 5/1970 | Watanabe et al. | 136/146 X |
| 3,546,143 | 12/1970 | Corbett | 260/17.4 |

Primary Examiner—Donald L. Walton
Attorney, Agent, or Firm—Robert H. Robinson; Anthony J. Rossi; Wm. Wharton Smith

[57] ABSTRACT

An absorbent separator for an electric battery which comprises an elastomeric resin binder material (e.g. vinyl acetate-ethylene copolymer) blended with a gelling agent (e.g. starch, flour) which absorbs the battery electrolyte and immobilizes it in contact with the anode surface. This absorbent separator swells as it absorbs the battery electrolyte which improves the conductivity and helps to avoid selective corrosion of the anode surface. The absorbent separator, which may be self-supporting, has sufficient strength for use with automatic battery manufacturing machinery. When used in conventional Le Clanche primary batteries, these absorbent separators hold the battery discharge product in place and thereby help to prevent battery leakage.

14 Claims, 1 Drawing Figure

PATENTED JUN 10 1975
3,888,700
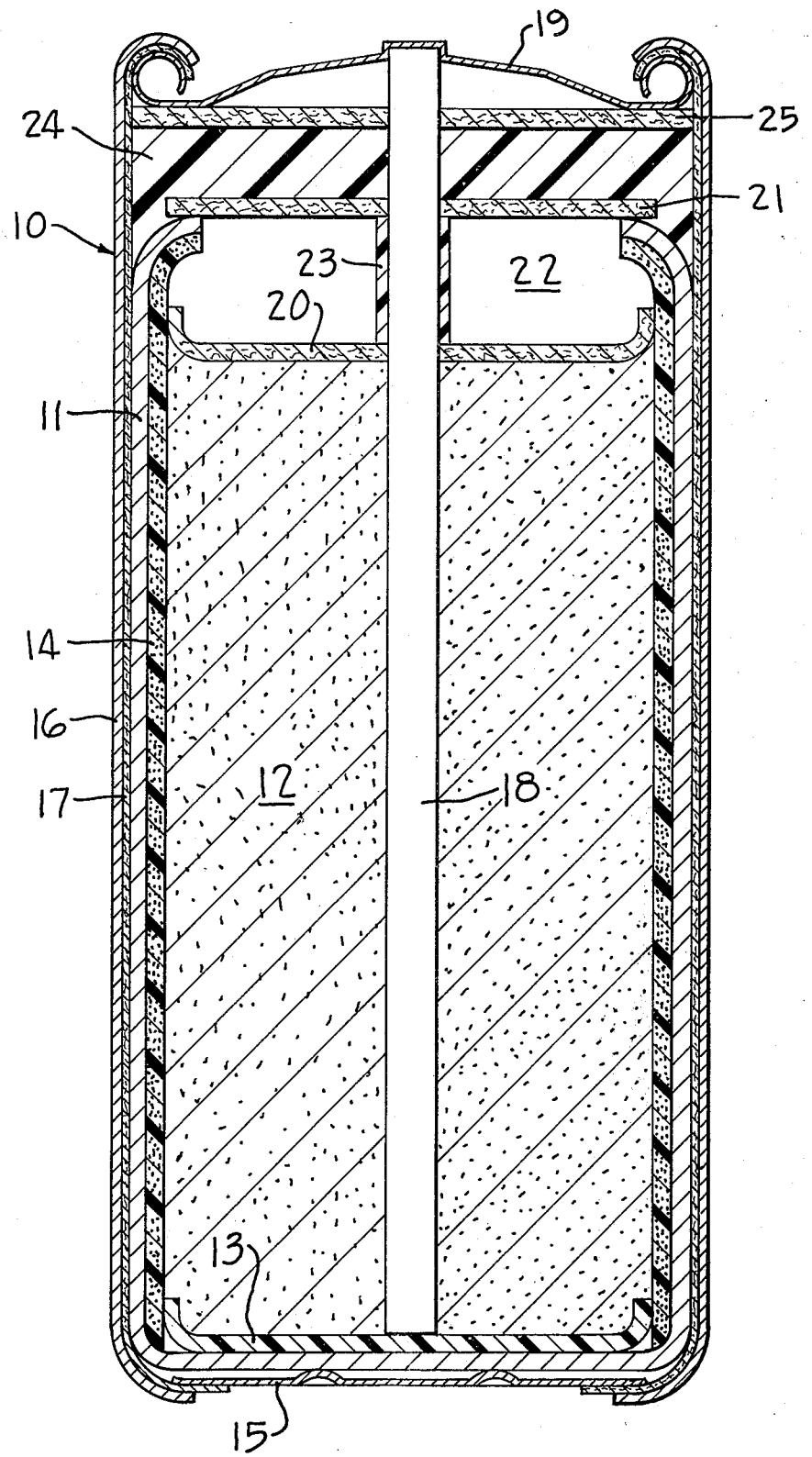

ABSORBENT SEPARATOR FOR AN ELECTRIC BATTERY

BACKGROUND OF THE INVENTION

In the electric battery art, many types of material and combinations of material have been used as separators interposed between the positive (cathode) and negative (anode) electrodes. In both primary and secondary batteries it has been found that the separator is a critical feature in determining the battery performance. The separator material is particularly critical in batteries which utilize cathode materials that are appreciably soluble in the battery electrolyte solution.

The problem caused by cathode materials which are soluble in the electrolyte is the polarization of the anode material by contact with the cathode material dissolved or otherwise present in the electrolyte. Semipermeable membranes have been used as separators to overcome this problem, but unfortunately, semipermeable membranes do not hold much electrolyte, and it is important that the anode surface be wetted by battery electrolyte in order to avoid selective corrosion of the anode. In recently developed battery systems using an organic material as the depolarizer (cathode), such as disclosed in U.S. Pat. No. 3,357,865, it is essential that the anode surface be thoroughly and uniformly wetted by electrolyte.

SUMMARY OF THE INVENTION

It is the general purpose of this invention to provide an absorbent separator for an electric battery which separator comprises an elastomeric resin binder which forms a continuous matrix for an electrolyte-absorbing gelling agent. The elastomeric resin binder/gelling agent separator of this invention can be formed into a film which when placed in an electric battery absorbs substantial amounts of electrolyte and immobilizes the electrolyte upon the surface of the anode. It has been found that zinc electrodes (anodes) are particularly subject to corrosion during high temperature storage, and the absorbent separators of this invention prevent this type of corrosion by keeping the anode surface uniformly wetted with electrolyte. An additional feature of the separator of this invention is that the elastomeric resin binder/gelling agent composition may be formed into films which have sufficient strength to be used with automatic manufacturing equipment.

A great variety of materials may be used as the components of the absorbent separator. The binder may comprise a natural or synthetic resin which forms a continuous matrix for holding the gelling agent, and it is essential that the binder be elastomeric or otherwise sufficiently resilient to withstand and permit the swelling of the gelling agent when it absorbs the battery electrolyte. A vinyl acetate-ethylene copolymer has been found to give good results when used as the binder ingredient, either alone or in combination with another resin such as a Neoprene resin. The gelling agent which absorbs the battery electrolyte may comprise colloid-forming materials such as carboxymethyl cellulose, methyl cellulose, starch, flour, polyacrylamides, gums and inorganic gelling agents such as silica gels.

An essential feature of the separators of this invention is that the elastomeric resin binder must be blended with the gelling agent in such a manner that the gelling agent doesn't gel prior to use in a battery. It is important that the gelling agent be maintained un-gelled until it contacts the battery electrolyte solution in order for it to absorb sufficient electrolyte to thoroughly and uniformly wet the anode surface with electrolyte. It is preferred that the resin binder and the gelling agent be dry blended.

The absorbent separators of this invention are particularly useful in secondary batteries employing organic depolarizers which are appreciably soluble in the electrolyte, such as the azodicarbonamide compounds disclosed in U.S. Pat. No. 3,357,865. It has been found that in batteries utilizing azodicarbonamide compounds as depolarizers, it is essential that the anode surface be uniformly wetted by the electrolyte, especially during high temperature storage, in order to avoid selective corrosion of the anode surface, for the anode will corrode at the interfaces between the wetted and the non wetted areas.

It has also been found that the absorbent separators of this invention are useful in conventional LeClanche primary batteries. These separators have exceptional capacity for absorbing liquids, and upon discharge of the primary batteries, it appears that the gelling agent absorbs the discharge product or otherwise holds the discharge product in place, thereby helping to prevent battery leakage.

BRIEF DESCRIPTION OF THE DRAWING

The drawing is a vertical sectional view of a battery using an absorbent separator in accordance with this invention.

DESCRIPTION OF THE PREFERRED EMBODIMENT

The elastomeric resin binder/gelling agent separator of this invention is useful in both primary and secondary batteries. This separator material is particularly useful in batteries having cathode active material which is soluble in the battery electrolyte solution such as recently developed organic depolarizers, e.g. azodicarbonamide compounds disclosed in U.S. Pat. No. 3,357,865. In batteries employing azodicarbonamide compounds as th cathode depolarizer ingredient, it has been found that the zinc electrode (anode) is particularly subject to corrosion during high temperature storage, and the absorbent separators of this invention prevent this type of corrosion by keeping the zinc surface uniformly wetted with electrolyte.

The elastomeric resin binder/gelling agent composition may be manufactured into films which have good strength characteristics. These films generally have thicknesses ranging from about 3 to about 15 mils, for films having a thickness greater than 15 mils cause higher internal resistance within the battery and loss of capacity. The film may be either self-supporting or the resin binder/gelling agent composition may be applied to a paper backing.

The elastomeric binder may comprise a natural or synthetic resin which is insoluble in the battery electrolyte and which forms a continuous matrix in which the gelling agent is bound. In general, the binder resin should be present in amounts ranging from about 10 to about 30 percent by weight of the total binder/gelling agent composition in order to form a continuous matrix with the gelling agent comprising the balance.

It is essential that the binder resin be elastomeric, that is sufficiently resilient to withstand and permit the swelling of the gelling agent when it absorbs the battery electrolyte. Examples of materials which can be used as the binder resin are polyethylene, vinyl acetate-ethylene copolymers, vinyl chloride-vinyl acetate copolymers, natural rubber, and synthetic rubber materials such as a Neoprene resin. A vinyl acetate-ethylene copolymer commercially available under the trademark ELVAX has been found to be a particularly effective binder resin when used alone or in combination with another elastomeric binder such as a Neoprene resin.

The gelling agent, which is essential bacause of its ability to absorb electrolyte and hold it in contact with the anode surface, may be selected from starch, flour, carboxymethyl cellulose, methyl cellulose, polyacrylamide resins, gums such as gum arabic, and inorganic gelling agents such as silica gels.

The elastomeric resin binder/gelling agent separator may be manufactured by dry blending a mixture of the binder resin and the gelling agent under heat and agitation, such as in a Banbury mixer, to form a homogeneous mixture. The following compositions are typical of the binder resin/gelling agent mixes:

Composition A

| Ingredient | Amount (pts. by wt.) |
| --- | --- |
| vinyl acetate-ethylene copolymer(ELVAX 260) | 20 |
| vinyl acetate-ethylene copolymer(ELVAX 150) | 5 |
| wheat flour (GOLD MEDAL All-Purpose Flour) | 150 |
| corn starch | 75 |

Composition B

| Ingredient | Amount (pts. by wt.) |
| --- | --- |
| vinyl acetate-ethylene copolymer(ELVAX 260) | 22.5 |
| Neoprene resin | 22.5 |
| wheat flour (GOLD MEDAL All-Purpose Flour) | 170 |
| corn starch | 85 |

Composition A was mixed at 100°C. for about 7 minutes to form a homogeneous mixture. Then the mixture was formed into sheets having a thickness of 5 to 7 mils on a roller mill whose rolls were heated to 85°C. At a subsequent time, the sheets were chopped into particles which were again fed to a roller mill to sheet the material. The rolls were maintained at about 100°C., and the preblended particles were sprinkled between the heated rolls of the mill and a sheet was formed. The setting of the roll clearance may be varied depending on the sheet thickness desired, with a separator thickness (dry) of about 5 mils having been found to be satisfactory.

An alternate procedure which has been used comprises forming a film of the vinyl acetate-ethylene copolymer (pre-weighed) on a roller mill, and then sprinkling an appropriate amount of pre-blended starch-wheat flour (pre-weighed) between the heated rolls (100°C.) of a roller mill and allowing the starch-flour blend to impregnate the plastic film to form a homogeneous separator material. A more recently developed method for making the separator film comprises dry blending powdered ethylene-vinyl acetate copolymer (ELVAX) with the gelling agent in appropriate proportions, and then this mixture is sprinkled between the heated rolls of a mill to form a film. This method is preferred because it is faster than the other methods, and it is now commercially feasible for the ethylene-vinyl acetate copolymer is commercially available in powdered form.

An important feature of these manufacturing procedures is that the resin binder and the gelling agent are blended in such a manner that the gelling agent is not gelled, preferably dry blended. This is a critical factor for the absorbent properties of this separator. In this manner, the gelling agent does not gel until it is contacted by battery electrolyte solution. It is also important that no solvent for the resin be present during the blending, for this would form a resin solution which would impregnate and mask the gelling agent, thereby impairing its ability to absorb the electrolyte.

Referring now to the drawing, a dry cell battery 10 having an elastomeric binder/gelling agent separator of this invention is illustrated. This particular construction was designed for the recently developed azodicarbonamide organic depolarizer, but it should be noted that the use of the absorbent separators of this invention is not limited to this type of construction. The battery 10 comprises a zinc anode 11 which also functions as a container for the cathode mix 12. The cathode mix 12 is separated from the zinc anode 11 by a plastic bottom cup 13 and an elastomeric binder/gelling agent separator 14 in accordance with this invention. The cathode mix may comprise a mixture of a depolarizer such as manganese dioxide or an azodicarbonamide compound, conductive carbon particles and electrolyte such as a standard LeClanche electrolyte (ammonium chloride/zinc chloride aqueous solution).

The zinc anode 11 is in contact with a metallic bottom disk 15 which serves as the negative terminal. Both the bottom disk 15 and the zinc anode 11 are electrically insulated from the outer steel jacket 16 by a paper tube 17. The cathode mix 12 has a carbon pencil 18 inserted therein, and the carbon pencil 18 serves as a current collector and is in contact with the metallic cap 19 which serves as both the positive terminal and the top closure of the battery. After the carbon pencil 18 is inserted into the cathode mix 12, a plastic or paper compression washer 20, having a hole therein to receive the carbon pencil, is placed on the top surface of the cathode mix 12. The top edge of the zinc anode 11 is rolled inwardly to form a ledge or surface for supporting a plastic or paper seal washer 21 in such a manner as to provide an air space 22 between the seal washer 21 and the compression washer 20. Before placing the seal washer 21 when the cathode mix 12 contains an azodicarbonamide compound as the depolarizer, a plastic sleeve 23 is placed over the carbon pencil 18 which is covered by the plastic sleeve 23 throughout the air space 22. After the seal washer 21 is in place, it is covered by a softened asphaltic sealing composition 24 on top of which is placed a gas permeable paper vent washer 25. Then the battery is closed by placing the metallic cap 19 over the carbon pencil 18 and the vent washer 25, and the top edge of the steel jacket 16 and the paper tube 17 is crimped over the edge of the cap 19.

The elastomeric binder/gelling agent separator of this invention has also been used as the separator in a conventional LeClanche primary battery. This separator was substituted for the cereal, starch and flour paste separator or the cereal, starch coated paper separator which are the standard LeClanche battery separator materials. It was observed that the LeClanche batteries using the separator of this invention exuded much less discharge product upon the top of the cathode mix. It appears that the gelling agent absorbs the discharge product or otherwise holds it in place, thereby helping to reduce battery leakage.

The following examples illustrate the improved characteristics of batteries employing an elastomeric binder/gelling agent separator in accordance with this invention.

EXAMPLE I

Electric batteries of the "D" size (standard flashlight size) employing a dibutyl azodicarbonamide organic depolarizer and zinc anodes were tested for storage life, both at room temperature (70°F.) and high temperature (113°F.). These batteries had a construction substantially similar to that illustrated in FIG. 1, with the sole variable being the separator material. One set of batteries were assembled using a Victory paper-cellophane separator (P-C), and the other set employed an ELVAX-starch and wheat flour separator (E) of this invention comprising 10 percent by weight of ELVAX(vinyl acetate-ethylene copolymer) resin, 60 percent by weight of wheat flour and 30 percent by weight of corn starch. The batteries were tested after the indicated storage by discharging them through a 2.2 ohm load, and amperage, impedance and percent efficiency were determined. The percent efficiency was defined as the percent of theoretical capacity obtained upon discharge of the batteries to a 0.8 volt cutoff, with the batteries having been recharged after their storage.

The following results were recorded:

This data clearly illustrates that the batteries using paper-cellophane separators suffered substantial deterioration during storage, particularly high temperature storage which resulted in their being unrechargable after 2 months at 113°F. as indicated by 0 percent efficiency. In contrast thereto, batteries using the ELVAX-starch, flour separators gave vastly superior performance and could be recharged to 44 percent efficiency after 3 months at 113°F. These results were very unexpected in view of the fact that the paper-cellophane separator is generally regarded as being an excellent separator material with respect to cycle life performance for batteries employing an azodicarbonamide compound as the depolarizer.

EXAMPLE II

Standard C size paperlined LeClanche cells employing a conventional $MnO_2$ depolarizer-depolarizer-carbon pencil cathode, zinc can anode and $NH_4Cl/ZnCl$ aqueous electrolyte solution were prepared to test the performance on storage of an absorbent separator of this invention. The Control separator was a standard cereal coated Kraft paper. Separator A comprised 15 percent by weight of an ELVAX resin binder (4 parts by weight ELVAX 260 and 1 part ELVAX 150) blended with 85 percent by weight of a cereal mix (2 parts by weight wheat flour to 1 part cornstarch) with an untreated Kraft paper backing for added strength. Separator B used the same ingredients with the cereal mix comprising 90 percent by weight and 10 percent by weight of ELVAX resin binder.

The cells were prepared by lining zinc cans with the separator material and inserting the cathode mix in the form of a cylindrical plug. In the cells with the ELVAX resin binder separator, the paper backing was placed in contact with the cathode mix and the ELVAX resin/cereal material was in contact with the zinc can. The cathode mix was compressed in the zinc can to provide intimate contact, and subsequent insertion of the carbon pencil into the cathode mix caused electrolyte from the mix to be forced into the separator. The cells were sealed in steel jackets in conventional manner.

These cells were tested for leakage in 20 cell lots. The leakage tests involved discharging individual cells for 24 hours through a 4 ohm resistor and then storing the cells at room temperature on open circuit. The cells were examined weekly for external leakage and the following results were reported:

| Separator | Initial | | | 3 Months at 70°F. | | | 6 Months at 70°F. | | |
|---|---|---|---|---|---|---|---|---|---|
| | Amp. | Imp. (ohms) | % Eff. | Amp. | Imp. (ohms) | % Eff. | Amp. | Imp. (ohms) | %Eff. |
| P-C | 5.3 | 0.3 | 85= | 3.8 | .6 | 72 | 2.0 | .8 | 57= |
| E | 5.5 | 0.3 | 85 | 4.8 | .5 | 75 | 3.6 | .4 | 76 |

| Separator | 1 Month at 118°F. | | | 2 Months at 113°F. | | | 3 Months at 113°F. | | |
|---|---|---|---|---|---|---|---|---|---|
| | Amp. | Imp. (ohms) | % Eff. | Amp. | Imp. (ohms) | % Eff. | Amp. | Imp. (ohms) | %Eff. |
| P-C | 1.9 | 1.0 | 57 | 0.4 | 4.4 | 0 | — | — | — |
| E | 3.5 | 0.5 | 56 | 2.1 | 0.6 | 40 | 1.5 | 1.1 | 44 |

| | % Leakers | | | | | | | | |
|---|---|---|---|---|---|---|---|---|---|
| Time (weeks) | 1 | 2 | 3 | 4 | 5 | 6 | 7 | 9 | 10 |
| Control | 20 | 90 | 95 | 100 | | | | | |
| Separator A | 10 | 35 | 50 | 65 | 80 | 80 | 100 | | |
| Separator B | 5 | 10 | 10 | 45 | 55 | 85 | 85 | 85 | 100 |

This data clearly demonstrates that the cells with separators A and B had much better leakage resistance.

Having completely described this invention, what is claimed is:

1. An electric battery having an anode, a cathode mix comprising a depolorizer and an aqueous electrolyte solution, and an absorbent separator sheet material between said anode and cathode, said absorbent separator consisting essentially of an elastomeric resin binder forming a continuous matrix blended with a gelling agent capable of absorbing and retaining battery electrolyte, said elastomeric resin binder comprising from about 10 to about 30 percent by weight of the separator with the balance being gelling agent, said binder and gelling agent being dry blended whereby the gelling agent is not gelled, and said separator being in the form of a film having a thickness from about 3 to about 15 mils.

2. A battery in accordance with claim 1 in which the elastomeric resin binder is a vinyl acetate-ethylene copolymer.

3. A battery in accordance with claim 1 in which the elastomeric resin binder is a vinyl acetate-ethylene copolymer and the gelling agent is a mixture of starch and flour.

4. An electric battery having an anode, a cathode mix comprising a depolarizer and an aqueous electrolyte solution, and an absorbent separator sheet material between said anode and cathode, said separator consisting essentially of an elastomeric resin binder forming a continuous matrix blended with a gelling agent capable of absorbing and retaining said electrolyte, said elastomeric binder comprising from about 10 to about 30 percent by weight of the separator with the balance being gelling agent, and said gelling agent containing a liquid consisting of said aqueous electrolyte solution.

5. A battery in accordance with claim 4 in which the elastomeric resin binder is a vinyl acetate-ethylene copolymer.

6. A battery in accordance with claim 4 in which the elastomeric resin binder is a vinyl acetate-ethylene copolymer and the gelling agent is a mixture of starch and flour.

7. A battery in accordance with claim 4 in which the depolarizer is an azodicarbonamide compound.

8. A battery in accordance with claim 7 in which the elastomeric resin binder is a vinyl acetate-ethylene copolymer.

9. A dry cell comprising a zinc casing serving as a negative electrode, a cathodic mixture disposed in said zinc casing, separator interposed between said zinc casing and said cathodic mixture and an electrolyte retained by said separator, said separator being composed of a paste powder and thermoplastic resin particles, said thermoplastic resin particles being bonded to each other to form a net structure adapted to retain said paste powder therein and said paste powder being gelatinized to retain said electrolyte.

10. A dry cell according to claim 9 wherein said paste powder consists of at least one of cellulose derivitive powder, synthetic paste powder and processed starch powder.

11. A dry cell according to claim 9, wherein said thermoplastic resin consists of at least one of polyethylene and polyethylene-polyvinyl acetate copolymer.

12. A dry cell according to claim 9, wherein said mixture to form the separator is composed of 70 to 90 parts by weight of the paste powder and 30 to 10 parts by weight of the thermoplastic resin.

13. A dry cell according to claim 9 wherein a second electrolyte absorbing powder is added to said mixture of the paste powder and the thermoplastic resin used for the formation of a separator.

14. A method of producing the dry cell according to claim 9, including the steps of heating the mixture of the paste powder and the thermoplastic resin to form a film of net structure, retaining the paste particles in the meshes of the net structure, lining the inside of the zinc casing with said film, and gelatinizing said paste powder with said electrolyte.

* * * * *